United States Patent
Kato et al.

(10) Patent No.: US 9,879,642 B2
(45) Date of Patent: Jan. 30, 2018

(54) STRADDLE TYPE VEHICLE

(71) Applicant: HONDA MOTOR CO., LTD., Tokyo (JP)

(72) Inventors: Kazuyuki Kato, Asaka (JP); Kazuhito Hotta, Iruma-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/138,270

(22) Filed: Apr. 26, 2016

(65) Prior Publication Data

US 2016/0348621 A1 Dec. 1, 2016

(30) Foreign Application Priority Data

May 29, 2015 (JP) .................................. 2015-110665

(51) Int. Cl.

| | |
|---|---|
| *F02M 35/04* | (2006.01) |
| *F02M 35/10* | (2006.01) |
| *B62M 7/02* | (2006.01) |
| *F02M 35/16* | (2006.01) |
| *F02M 35/116* | (2006.01) |
| *F02D 9/10* | (2006.01) |

(52) U.S. Cl.
CPC ........ *F02M 35/10373* (2013.01); *B62M 7/02* (2013.01); *F02D 9/109* (2013.01); *F02D 9/1035* (2013.01); *F02M 35/048* (2013.01); *F02M 35/10216* (2013.01); *F02M 35/116* (2013.01); *F02M 35/162* (2013.01)

(58) Field of Classification Search
CPC ....... F02M 35/10373; F02M 35/10216; F02M 35/162; F02M 35/048; F02D 9/109; F02D 9/1035

See application file for complete search history.

(56) References Cited

U.S. PATENT DOCUMENTS

| | | | | |
|---|---|---|---|---|
| 2008/0078355 | A1* | 4/2008 | Maehara | ................. F02D 9/107 123/399 |
| 2009/0241900 | A1* | 10/2009 | Sato | ..................... F02D 9/1095 123/438 |
| 2009/0266334 | A1* | 10/2009 | Kasai | .................... F02D 9/1065 123/337 |
| 2015/0083078 | A1* | 3/2015 | Kontani | ............... F02D 9/1065 123/337 |

(Continued)

FOREIGN PATENT DOCUMENTS

| | | |
|---|---|---|
| JP | A-06-085472 | 3/1994 |
| JP | A-2003-095176 | 4/2003 |

(Continued)

OTHER PUBLICATIONS

JP Office Action dated Oct. 31, 2017 from corresponding Japanese patent application No. 2015-110665 (with attached English-language translation).

*Primary Examiner* — Jacob D Knutson
*Assistant Examiner* — Gabriela C Craciun
(74) *Attorney, Agent, or Firm* — Drinker Biddle & Reath LLP

(57) ABSTRACT

In a straddle type vehicle including a body frame, a power unit supported to the body frame, and a throttle body connected to the power unit and adjusting the intake air amount, a gyro sensor for detecting behavior of the vehicle is arranged in the throttle body.

6 Claims, 12 Drawing Sheets

(56) References Cited

U.S. PATENT DOCUMENTS

| | | | |
|---|---|---|---|
| 2015/0107563 A1* | 4/2015 | Naruoka | F02M 35/14 123/559.1 |
| 2016/0061162 A1* | 3/2016 | Watanabe | B62K 19/48 123/559.1 |
| 2016/0061163 A1* | 3/2016 | Watanabe | B62M 7/02 123/559.1 |
| 2016/0061165 A1* | 3/2016 | Watanabe | F02B 33/40 123/445 |

FOREIGN PATENT DOCUMENTS

| | | | |
|---|---|---|---|
| JP | A-2006-029248 | | 2/2006 |
| JP | A-2006-063855 | | 3/2006 |
| JP | UM-B-3156172 | | 12/2009 |
| JP | A-2010-059942 | | 3/2010 |
| JP | B-4489567 | | 6/2010 |
| JP | 2013-136313 A | * | 7/2011 |
| JP | 2013-136313 A | | 7/2013 |
| JP | A-2015-085905 | | 5/2015 |

* cited by examiner

STRADDLE TYPE VEHICLE

CROSS-REFERENCE TO RELATED APPLICATION

Priority is claimed on Japanese Patent Application No. 2015-110665, filed on May 29, 2015, the contents of which are incorporated herein by reference.

BACKGROUND OF THE INVENTION

Field of the Invention

The present invention relates to a straddle type vehicle.

Description of Related Art

Conventionally, there has been a straddle type vehicle disclosed in Japanese Patent Application Publication No. 2013-136313, for example. In this configuration, a gyro sensor is arranged in front of a head pipe.

SUMMARY OF THE INVENTION

However, since the distance between the engine (vibration source) and the gyro sensor is large, vibration detected by the gyro sensor as noise tends to become large. Also, since the gyro sensor is arranged in a position higher than the position of the center of gravity of the vehicle, it tends to be affected by vertical swinging of a front fork and a cushion unit, for example (parallelism inhibition factors). For this reason, it is desirable that the gyro sensor be arranged close to the center of gravity of the vehicle, but thermal influence of the engine needs to be considered. Hence, there are certain limitations as to where to arrange the gyro sensor, and there has been a problem in accurate detection of vehicle behavior.

Against this background, an objective of the present invention is to detect vehicle behavior accurately, in a straddle type vehicle including a gyro sensor that detects vehicle behavior.

As means for solving the above problem, an invention described in claim 1 is a straddle type vehicle (1) including: a body frame (20); a power unit (10) supported to the body frame (20); and a throttle body (30) connected to the power unit (10) and adjusting an intake air amount, characterized in that a gyro sensor (80) for detecting behavior of the vehicle (1) is arranged in the throttle body (30).

An invention described in claim 2 is characterized in that the gyro sensor (80) is arranged in a bracket (90) supported to the throttle body (30).

An invention described in claim 3 is characterized in that: the power unit (10) includes a front cylinder (13) and a rear cylinder (14), which are arranged at the front and rear with a gap in between; the throttle body (30) includes a front throttle body (31) connected to the front cylinder (13), and a rear throttle body (32) connected to the rear cylinder (14); and the bracket (90) is arranged so as to bridge the front throttle body (31) and the rear throttle body (32).

An invention described in claim 4 is characterized in that the gyro sensor (80) is supported to the bracket (90) through an elastic member (84).

An invention described in claim 5 is characterized in that: the gyro sensor (80) is supported to the bracket (90) through a collar (85); the collar (85) includes a cylindrical tube portion (85*a*), and an annular flange portion (85*b*) having an outer diameter (D2) larger than an outer diameter (D1) of the tube portion (85*a*); the bracket (90) includes a supporting portion (94), which is formed into a plate capable of supporting the collar (85); the supporting portion (94) has a long hole (94*h*) including a large-diameter portion (94*k*) opened in the thickness direction of the supporting portion (94), and having an inner diameter (d1) which is the same or larger than the outer diameter (D2) of the flange portion (85*b*), and a small-diameter portion (94*j*) continuous with the large-diameter portion (94*k*), and having an inner diameter (d2) which is the same as the outer diameter (D1) of the tube portion (85*a*), or larger than the outer diameter (D1) of the tube portion (85*a*) and smaller than the outer diameter (D2) of the flange portion (85*b*); and the collar (85) is supported to the supporting portion (94), such that the tube portion (85*a*) is inserted into the small-diameter portion (94*j*), and the flange portion (85*b*) is arranged so as to sandwich the small-diameter portion (94*j*) at least from the upper side.

An invention described in claim 6 is characterized in that: the body frame (20) includes paired left and right main frames (22); an air cleaner box (40) for cleaning intake air of the throttle body (30) is provided, between the paired left and right main frames (22) in the vehicle width direction; and the gyro sensor (80) is arranged inside the air cleaner box (40).

An invention described in claim 7 is characterized in that: an air cleaner element (41) is provided inside the air cleaner box (40); and the gyro sensor (80) is arranged on a clean side (40*s*) positioned on the downstream side of the air cleaner element (41).

An invention described in claim 8 is characterized in that the gyro sensor (80) is arranged near an intake part (35), which is provided in an upper part of the throttle body (30).

According to the invention described in claim 1, the gyro sensor is arranged in the throttle body. Hence, the gyro sensor is arranged closer to the power unit than a case where the gyro sensor is arranged in front of the head pipe, so that vibration detected by the gyro sensor as noise can be reduced. Additionally, since the gyro sensor is arranged close to the position of the center of gravity of the vehicle, it is less likely to be affected by parallelism inhibition factors. Accordingly, behavior of the vehicle can be detected accurately.

According to the invention described in claim 2, the gyro sensor is arranged in the bracket supported to the throttle body. Hence, support stiffness of the gyro sensor can be improved.

According to the invention described in claim 3, the bracket is arranged so as to bridge the front throttle body and the rear throttle body. Hence, rigidity of the bracket can be improved, so that vibration detected by the gyro sensor as noise can be reduced effectively. Accordingly, behavior of the vehicle can be detected even more accurately.

According to the invention described in claim 4, the gyro sensor is supported to the bracket through the elastic member. This can suppress vibration transmitted to the gyro sensor, so that behavior of the vehicle can be detected even more accurately.

According to the invention described in claim 5, the collar is supported to the supporting portion, such that the tube portion is inserted into the small-diameter portion, and the flange portion is arranged so as to sandwich the small-diameter portion at least from the upper side. Hence, the collar can be kept from falling off when attaching the gyro sensor, and workability can be improved.

According to the invention described in claim 6, the gyro sensor is arranged inside the air cleaner box. Hence, in this configuration, the gyro sensor is not exposed to the outside, and therefore can avoid the influence of rain, for example (external factor), and its protective property can be improved.

According to the invention described in claim 7, the gyro sensor is arranged on the clean side, which is positioned on the downstream side of the air cleaner element. Hence, the gyro sensor can avoid the influence of dirt and dust, for example (external factor), and its protective property can be improved.

According to the invention described in claim 8, the gyro sensor is arranged near the intake part, which is provided in the upper part of the throttle body. Hence, the gyro sensor can be cooled by use of air taken into the power unit. Accordingly, even when the gyro sensor is arranged near the power unit, it can avoid the influence of heat of the power unit, for example (external factor), and its protective property can be improved.

DESCRIPTION OF EMBODIMENTS

Figure 1:
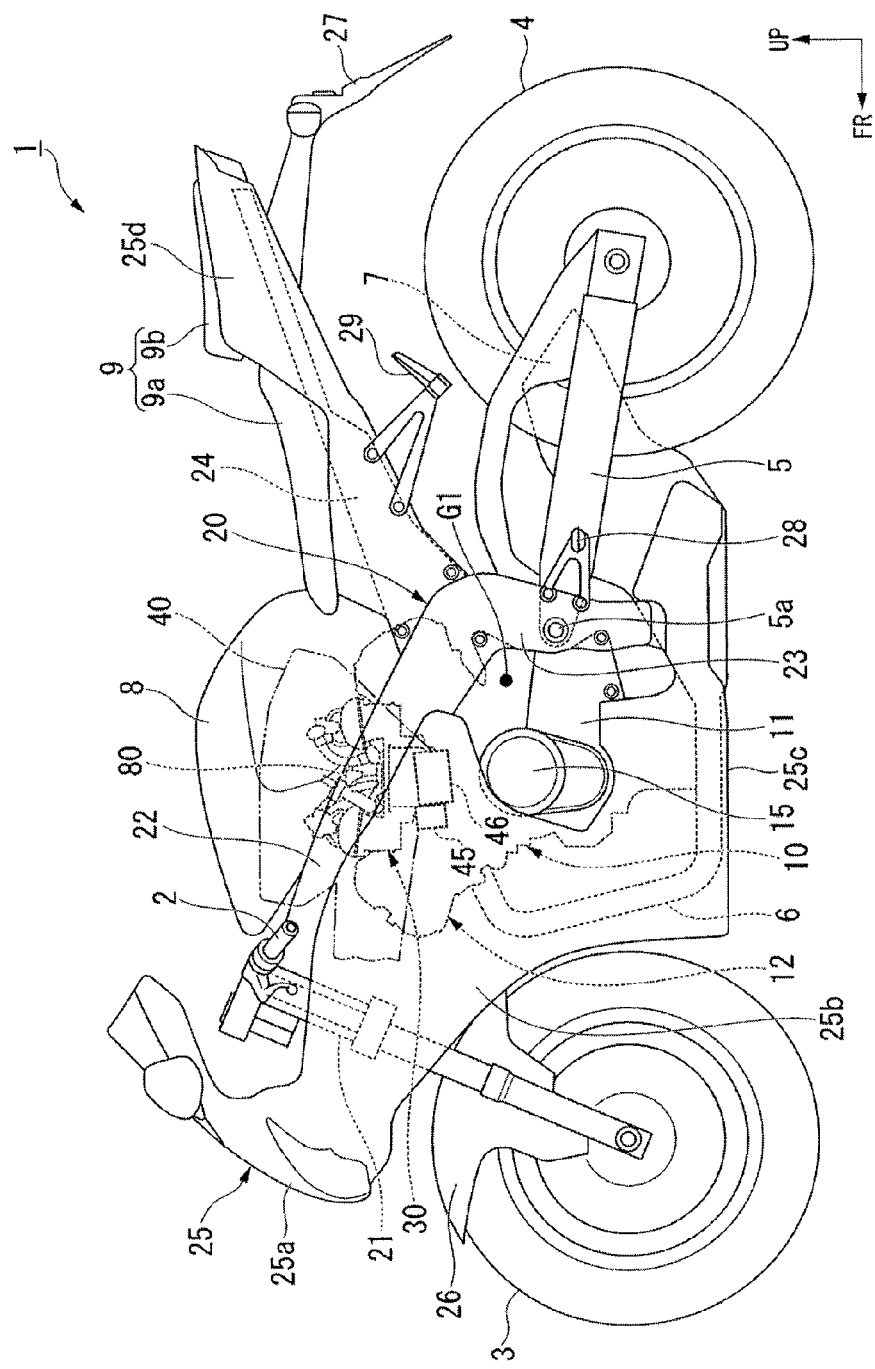
FIG. 1 is a left side view of a motorcycle of an embodiment of the present invention.

Hereinafter, an embodiment of the present invention will be described with reference to the drawings. Note that in the following description, directions such as front and rear, left and right are the same as directions of a vehicle described below, if not stated otherwise. Also, an arrow FR indicating the front of the vehicle, an arrow LH indicating the left of the vehicle, an arrow UP indicating the upper direction of the vehicle, and a vehicle left-right centerline CL are shown in appropriate parts in the drawings used in the following description.

<Entire Vehicle>

FIG. 1 shows a motorcycle 1 as an example of a straddle type vehicle. Referring to FIG. 1, the motorcycle 1 includes a bar handle 2, a front wheel 3 steered by the bar handle 2, and a rear wheel 4 driven by a power unit 10 including a V4 engine. The motorcycle is sometimes referred to simply as "vehicle" below.

Steering system parts including the bar handle 2 and the front wheel 3 are steerably and pivotally supported, to a head pipe 21 at the front end of a body frame 20. The power unit 10 is arranged in a longitudinal center part of the body frame 20. Paired left and right swing arms 5 are pivotally supported to a rear part of the power unit 10, so as to be vertically swingable around a pivot shaft 5a. An unillustrated rear suspension is interposed between front parts of the left and right swing arms 5 and a rear part of the body frame 20.

For example, the body frame 20 is formed by joining multiple kinds of steel materials into one body, by welding or other methods. The body frame 20 includes the head pipe 21, paired left and right main frames 22 extending in the rear lower direction from the head pipe 21, paired left and right pivot plates 23 connected to rear end parts of the paired left and right main frames 22 and extending downward, and paired left and right seat frames 24 connected to upper parts of the paired left and right pivot plates 23 and extending in the rear upper direction.

The power unit 10 is attached to the paired left and right pivot plates 23 and an unillustrated engine hanger. The power unit 10 includes a crankcase 11, a cylinder portion 12 arranged in an upper part of the crankcase 11 and formed into a V shape in side view, a generator cover 15 attached to a left side face of the crankcase 11, and an unillustrated clutch cover attached to a right side face of the crankcase 11.

A throttle body 30, which is connected to the cylinder portion 12 and configured to adjust the intake air amount, is provided above the power unit 10. An air cleaner box 40 for cleaning intake air of the throttle body 30 is provided, between the paired left and right main frames 22 in the vehicle width direction. A gyro sensor 80 is arranged inside the air cleaner box 40.

An exhaust pipe 6 is connected to the cylinder portion 12. The exhaust pipe 6 extends below the power unit 10, is arranged on the right side of the rear wheel 4, and is connected to a muffler 7 extending obliquely upward in the rear direction. A fuel tank 8 is arranged above the cylinder portion 12 and between the paired left and right main frames 22. A seat 9 is arranged behind the fuel tank 8 and on the paired left and right seat frames 24. The seat 9 includes a front seat 9a for the rider, and a rear seat 9b for the passenger.

A body cover 25 covers the body frame 20. The body cover 25 includes a front cowl 25a covering a front part of the body frame 20, a front side cowl 25b covering sides of a front part of the body frame 20, an under cowl 25c covering a lower part of the body frame 20, and a rear cowl 25d covering a rear part of the body frame 20.

A battery 45 and a power delivery unit (PDU) 46, which are rectangular in side view, are provided on the inner side in the vehicle width direction of the front side cowl 25b. The battery 45 and the power delivery unit 46 are attached to a left end part of the left main frame 22, through an unillustrated bracket. The battery 45 and the power delivery unit 46 are arranged adjacent to each other at the front and rear. Therefore, since the power delivery unit 46 is arranged closer to the battery 45, generation of unwanted resistance can be suppressed, and the current can be split effectively by the power delivery unit 46, as compared to a case where the battery 45 and the power delivery unit 46 are arranged away from each other. The current split by the power delivery unit 46 is supplied to the electric parts in appropriate current values.

Note that in FIG. 1, reference numeral 26 indicates a front fender, reference numeral 27 indicates a rear fender, reference numeral 28 indicates a main step on which the rider places his/her foot, reference numeral 29 indicates a pillion step on which the passenger places his/her foot, and reference numeral G1 indicates the position of the center of gravity of the vehicle 1.

Figure 2:
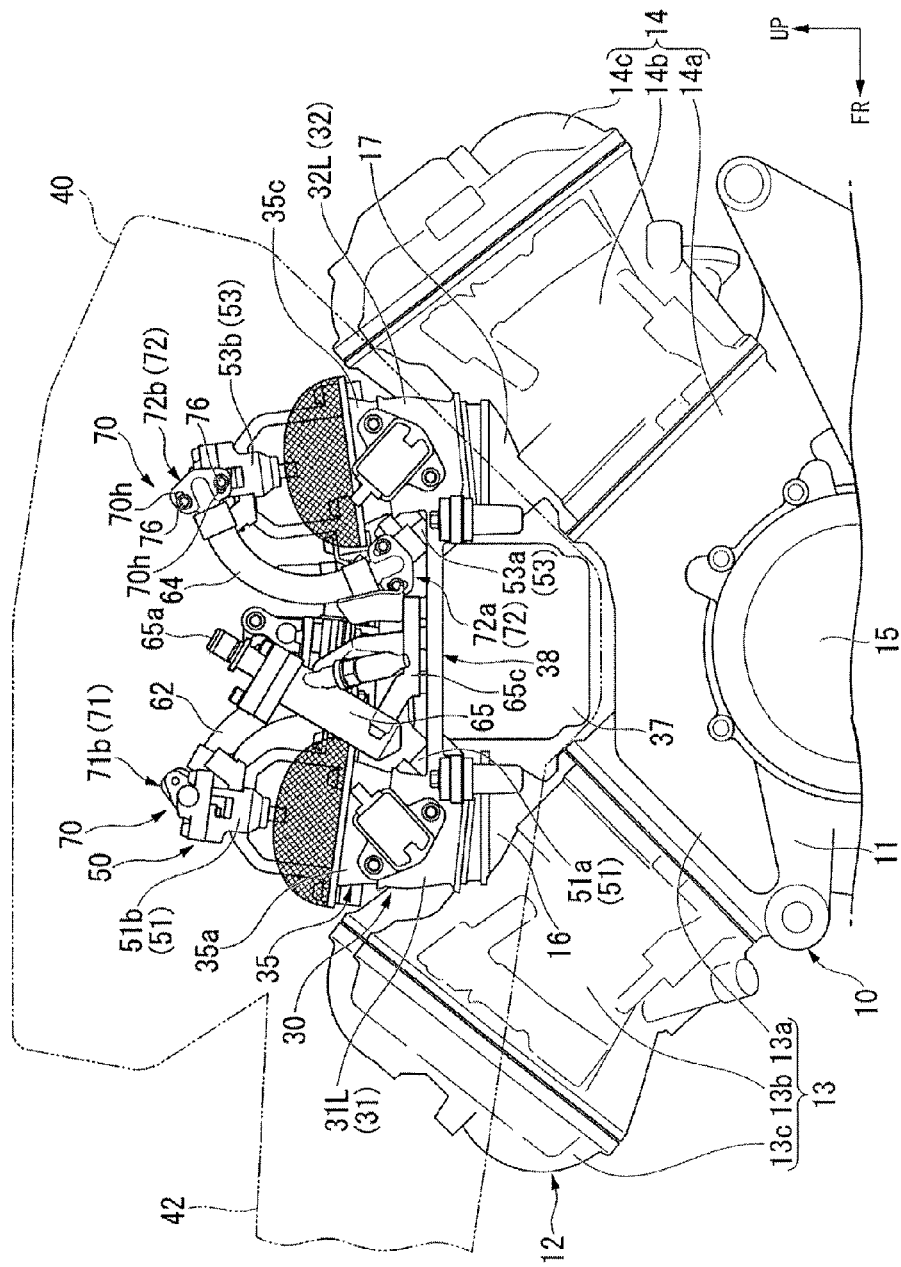
FIG. 2 is a left side view in which a main part of the aforementioned motorcycle is enlarged.

Also referring to FIG. 2, the cylinder portion 12 includes a front cylinder 13 and a rear cylinder 14, which are arranged at the front and rear with a gap in between. The front cylinder 13 protrudes toward the front upper direction from an upper part of the crankcase 11, while the rear cylinder 14 protrudes toward the rear upper direction from an upper part of the crankcase 11.

The front cylinder 13 includes a front cylinder block 13a formed integrally with a front upper part of the crankcase 11, a front cylinder head 13b attached to an upper end part of the front cylinder block 13a, and a front cylinder head cover 13c attached to an upper end part of the front cylinder head 13b.

The rear cylinder 14 includes a rear cylinder block 14a formed integrally with a rear upper part of the crankcase 11, a rear cylinder head 14b attached to an upper end part of the rear cylinder block 14a, and a rear cylinder head cover 14c attached to an upper end part of the rear cylinder head 14b.

A front intake port 16 is formed in a rear face of the front cylinder head 13b, while a rear intake port 17 is formed in a front face of the rear cylinder head 14b.

The air cleaner box 40 is arranged between the rear face of the front cylinder head 13b and the front face of the rear cylinder head 14b, so as to surround the throttle body 30 and other parts.

<Air Cleaner Box>

Figure 3:
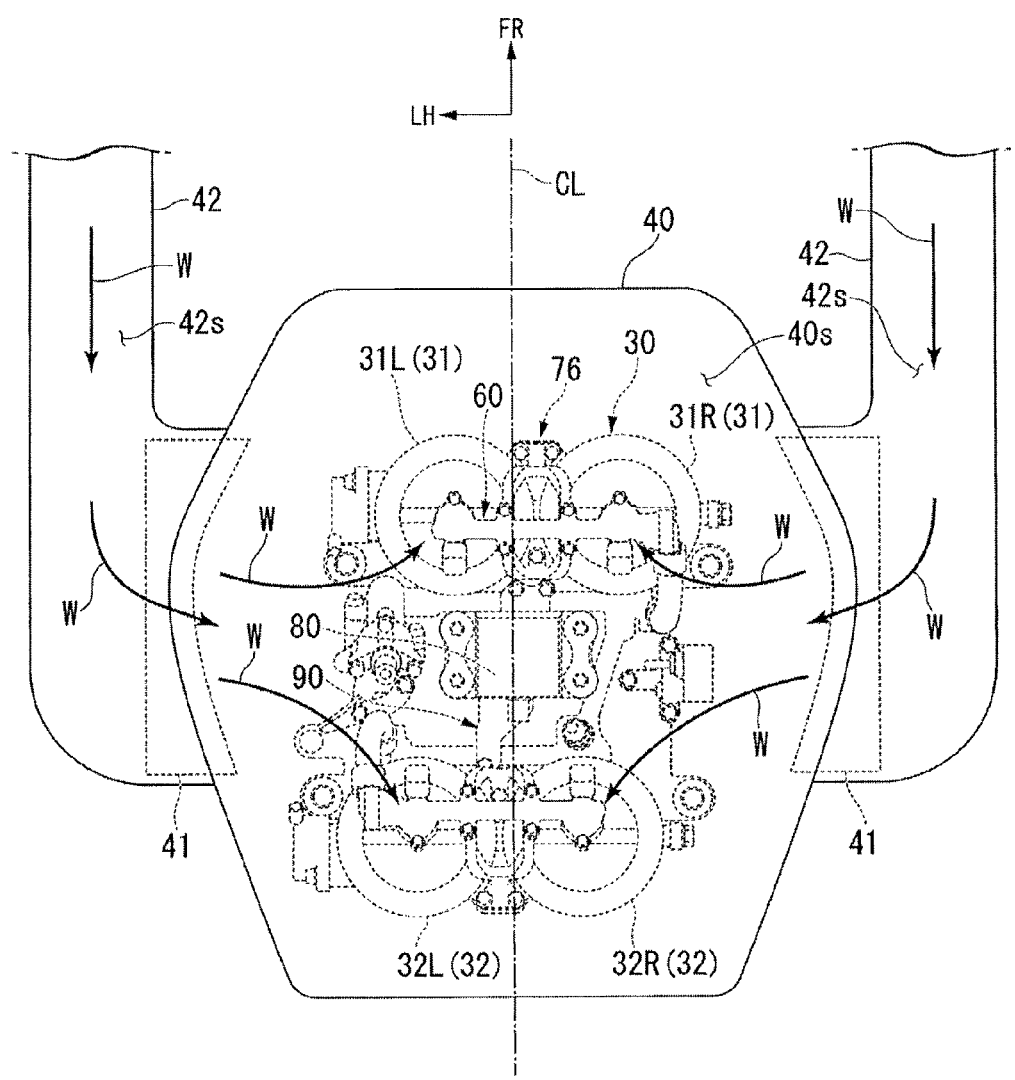
FIG. 3 is a top view of an air cleaner box of the aforementioned motorcycle.

Also referring to FIG. 3, the air cleaner box 40 is formed into a hexagonal box shape having rounded corners in top view. Intake ducts 42 are connected to left and right sides of the air cleaner box 40. The left and right intake ducts 42 extend longitudinally along the vehicle left-right centerline CL in top view, curve inward in the vehicle width direction on the rear end sides, and reach the left and right sides of the air cleaner box 40.

Air cleaner elements 41 are provided inside inner end parts in the vehicle width direction of the left and right intake ducts 42, on left and right side faces of the air cleaner box 40 (connection parts between the air cleaner box 40 and the left and right intake ducts 42). The left and right air cleaner elements 41 separate dirty sides 42s inside the left and right intake ducts 42 and a clean side 40s inside the air cleaner box 40. The dirty side 42s is positioned on the upstream side of the air cleaner element 41, and the clean side 40s is positioned on the downstream side of the air cleaner element 41. The gyro sensor 80 is arranged on the clean side 40s.

Outside air introduced into the dirty sides 42s inside the left and right intake ducts 42 pass through the air cleaner elements 41 from outer to inner sides in the vehicle width direction thereof, is filtered and reaches the clean side 40s, and thereafter passes through the throttle body 30 and other parts, to be sucked into the cylinder portion 12. Note that arrows W in FIG. 3 indicate the flow of intake air.

<Throttle Body>

Referring to FIG. 2, the throttle body 30 includes a front throttle body 31 connected to the front intake port 16, and a rear throttle body 32 connected to the rear intake port 17. The throttle body 30 adjusts the intake air amount by the front and rear throttle bodies 31, 32.

Figure 4:
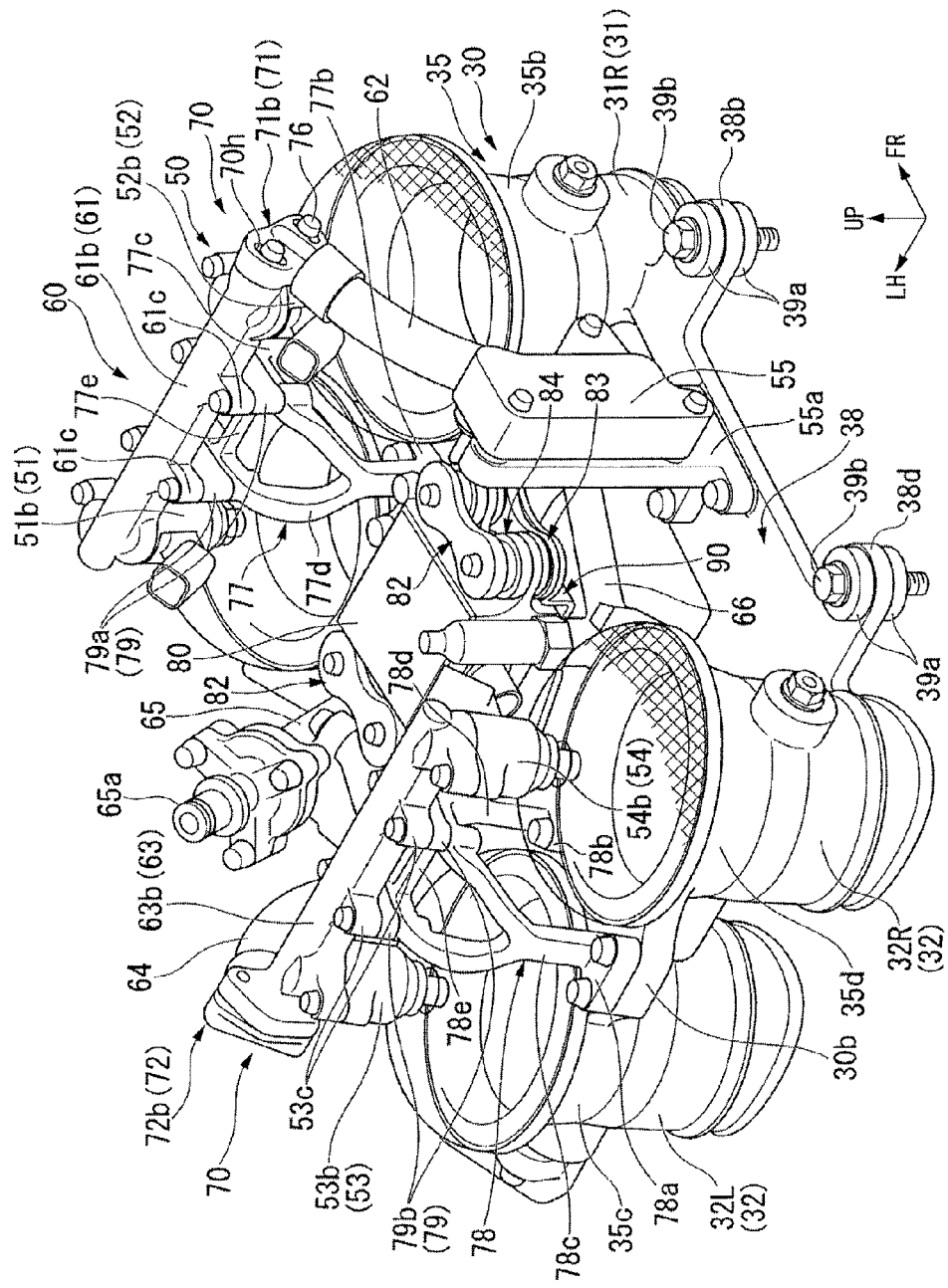
FIG. 4 is a perspective view of a gyro sensor arrangement structure of the aforementioned motorcycle, as seen from the rear upper right direction.
Figure 5:
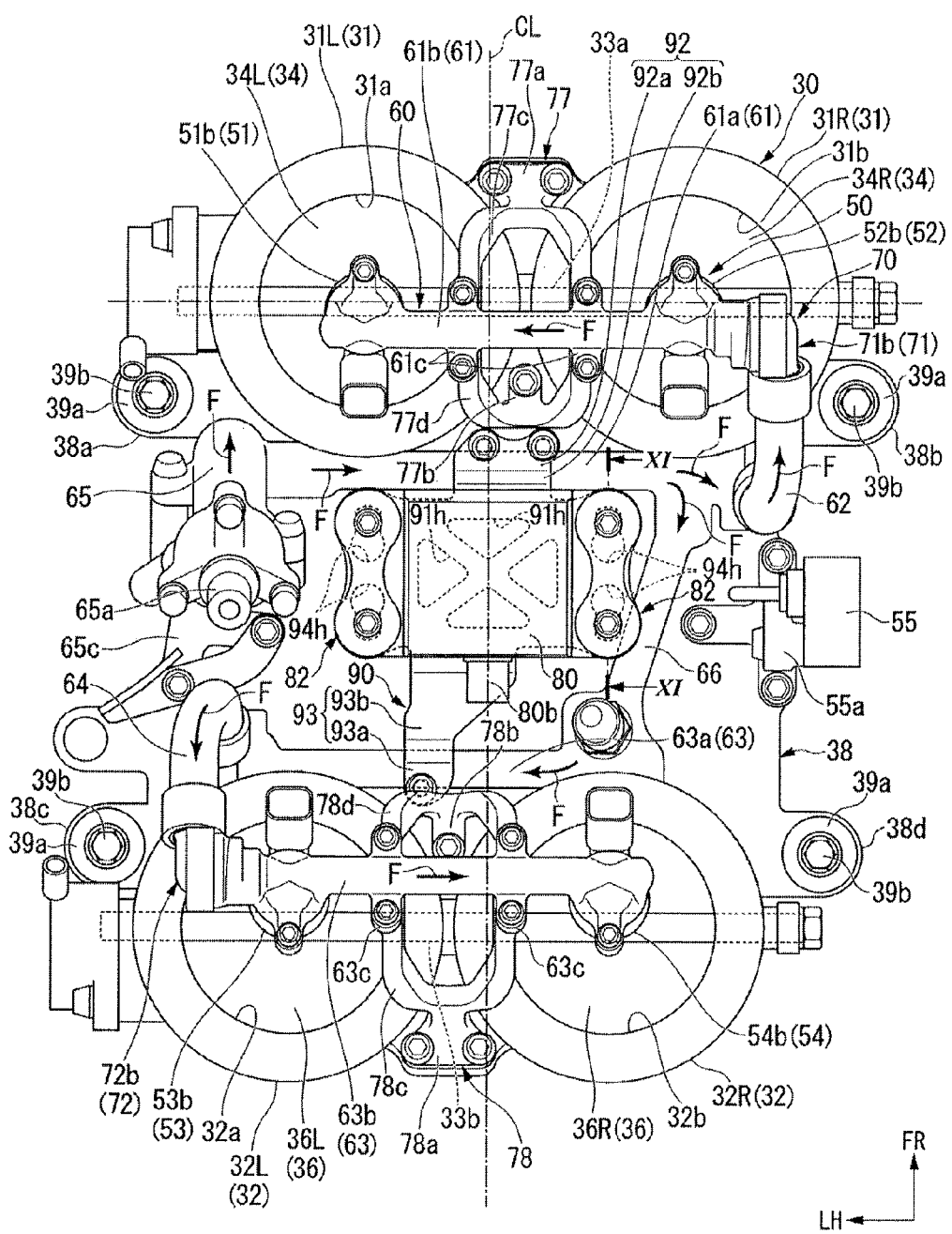
FIG. 5 is a top view of the aforementioned gyro sensor arrangement structure.

Also referring to FIGS. 4 and 5, the front throttle body 31 includes a left front throttle body 31L connected to a cylinder on the left front side of the engine, and a right front throttle body 31R connected to a cylinder on the right front side of the engine. A front valve shaft 33a extending along the vehicle width direction is rotatably supported, to the left front throttle body 31L and the right front throttle body 31R. A front throttle valve 34 is attached to the front valve shaft 33a. The front throttle valve 34 includes a left front throttle valve 34L for opening and closing an intake passage 31a inside the left front throttle body 31L, and a right front throttle valve 34R for opening and closing an intake passage 31b inside the right front throttle body 31R.

The rear throttle body 32 includes a left rear throttle body 32L connected to a cylinder on the left rear side of the engine, and a right rear throttle body 32R connected to a cylinder on the right rear side of the engine. A rear valve shaft 33b extending along the vehicle width direction is rotatably supported, to the left rear throttle body 32L and the right rear throttle body 32R. A rear throttle valve 36 is attached to the rear valve shaft 33b. The rear throttle valve 36 includes a left rear throttle valve 36L for opening and closing an intake passage 32a inside the left rear throttle body 32L, and a right rear throttle valve 36R for opening and closing an intake passage 32b inside the right rear throttle body 32R.

The front and rear throttle valves 34, 36 are driven by a valve driving device 37 (see FIG. 2), through an unillustrated link.

<Intake Part>

Figure 6:
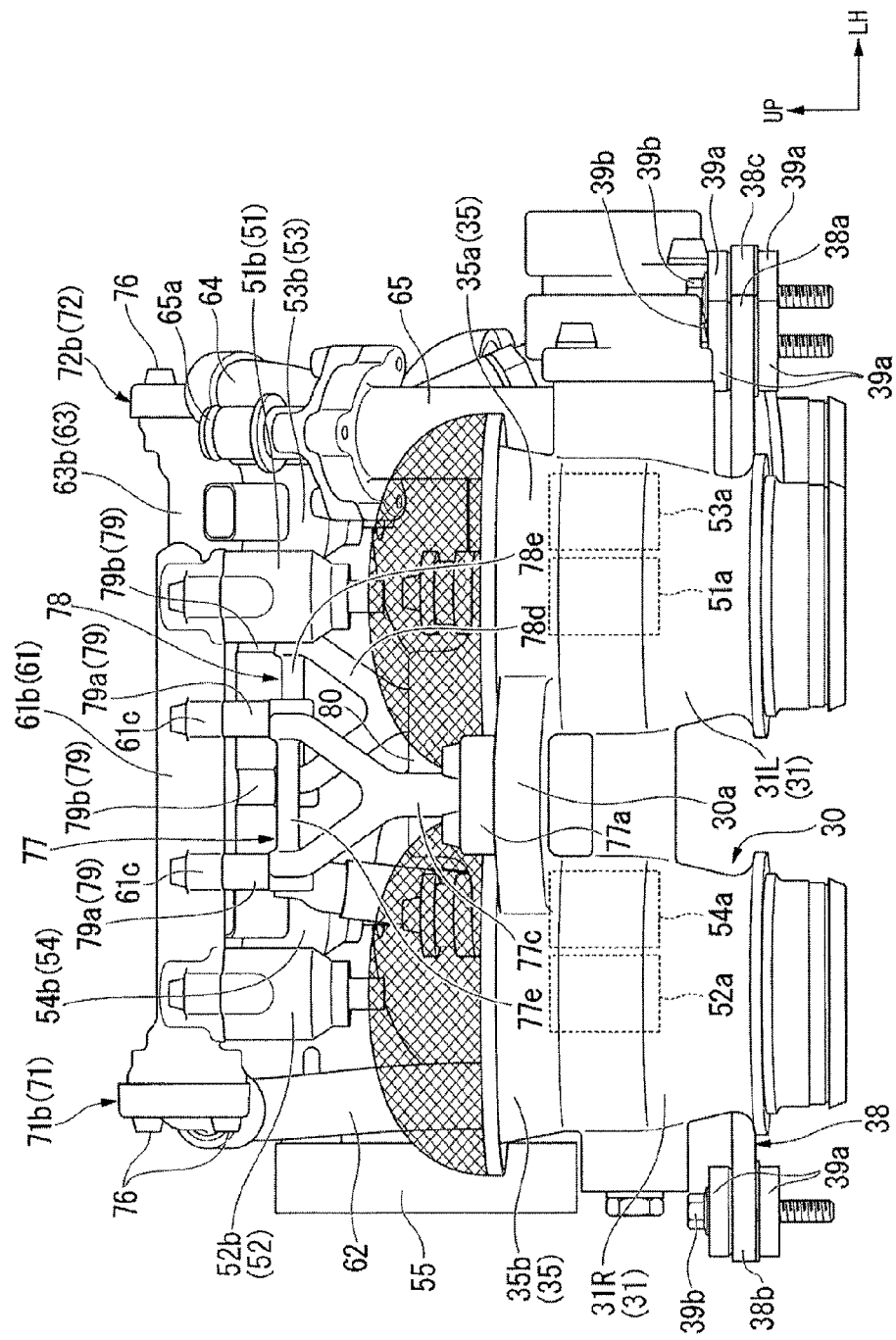
FIG. 6 is a front view of the aforementioned gyro sensor arrangement structure.

Also referring to FIG. 6, an intake part 35 is provided in an upper part of the throttle body 30. The intake part 35 includes a left front air funnel 35a in an upper part of the left front throttle body 31L, a right front air funnel 35b in an upper part of the right front throttle body 31R, a left rear air funnel 35c in an upper part of the left rear throttle body 32L, and a right rear air funnel 35d in an upper part of the right rear throttle body 32R. The gyro sensor 80 is arranged near the intake part 35. To be specific, the gyro sensor 80 is arranged in a space surrounded by the left front air funnel 35a, the right front air funnel 35b, the left rear air funnel 35c, and the right rear air funnel 35d.

A front connection portion 30a connecting the left front air funnel 35a and the right front air funnel 35b is formed, in an upper part of the front throttle body 31. The front connection portion 30a extends in the vehicle width direction so as to bridge the left front air funnel 35a and the right front air funnel 35b, and protrudes frontward so as to form a protrusion.

A rear connection portion 30b connecting the left rear air funnel 35c and the right rear air funnel 35d is formed, in an upper part of the rear throttle body 32. The rear connection portion 30b extends in the vehicle width direction so as to bridge the left rear air funnel 35c and the right rear air funnel 35d, and protrudes rearward so as to form a protrusion.

<Connection Plate>

A connection plate 38 connecting the front and rear throttle bodies 31, 32 is provided, between the front and rear throttle bodies 31, 32 provided at the front and rear. The connection plate 38 is formed into a plate, which is thick in the vertical direction. Protrusions 38a to 38d, which protrude outward in the vehicle width direction, are formed in front and rear end parts of the connection plate 38. A through hole (not shown) opened in the vertical direction is formed in each of the protrusions 38a to 38d. The connection plate 38 is fixed to the paired left and right main frames 22 (see FIG. 1), through brackets (not shown). For example, the connection plate 38 is fastened and fixed, by inserting bolts 39b into the through holes while clamping upper and lower faces of each of the protrusions 38a to 38d with a collar 39a or other parts, and screwing the bolts 39b into nuts (none are shown) provided in the brackets. Note that the connection plate 38 may be fixed by welding, for example.

A fuel injection device 50 for injecting fuel to the intake passage inside the throttle body 30, auxiliary machinery 55 of electric parts and other parts, and piping 60 attached to the fuel injection device 50, are provided above the connection plate 38.

Note that the fuel injection device 50 may be provided so as to inject fuel to an intake passage outside the throttle body 30. That is, it suffices that the fuel injection device 50 be provided so as to inject fuel, to an intake passage including the throttle body 30.

<Fuel Injection Device>

The fuel injection device 50 includes a left front injector 51 for injecting fuel to the intake passage 31a inside the left front throttle body 31L, a right front injector 52 for injecting fuel to the intake passage 31b inside the right front throttle body 31R, a left rear injector 53 for injecting fuel to the intake passage 32a inside the left rear throttle body 32L, and a right rear injector 54 for injecting fuel to the intake passage 32b inside the right rear throttle body 32R. The left front injector 51 and the right front injector 52 are arranged side by side in the vehicle width direction. The left rear injector 53 and the right rear injector 54 are arranged side by side in the vehicle width direction behind the left front injector 51 and the right front injector 52, with the gyro sensor 80 in between.

Note that the injectors 51, 53 and the injectors 52, 54 may each be arranged side by side in the direction that intersects with the vehicle width direction.

Figure 7:
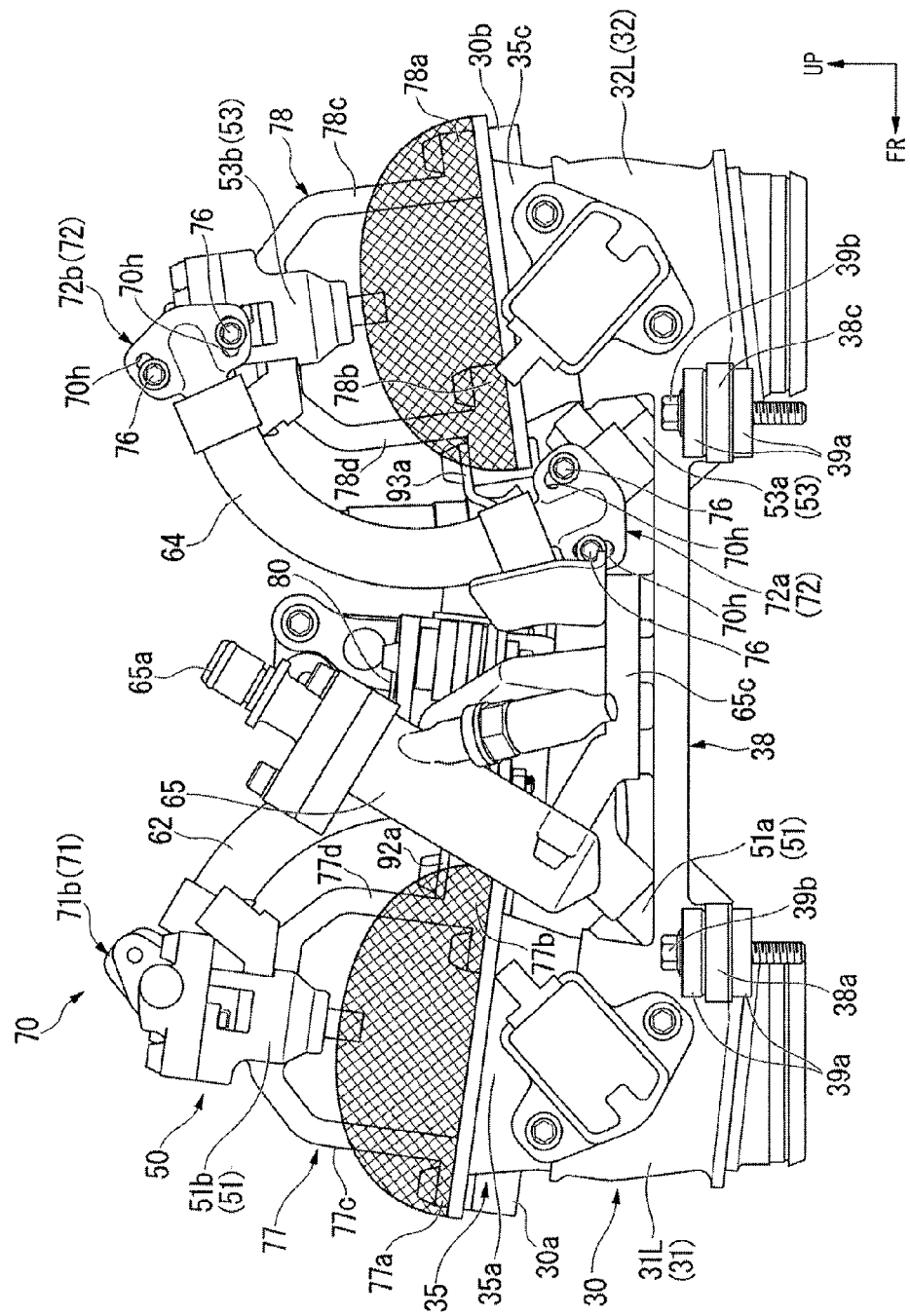
FIG. 7 is a left side view of the aforementioned gyro sensor arrangement structure.
Figure 8:
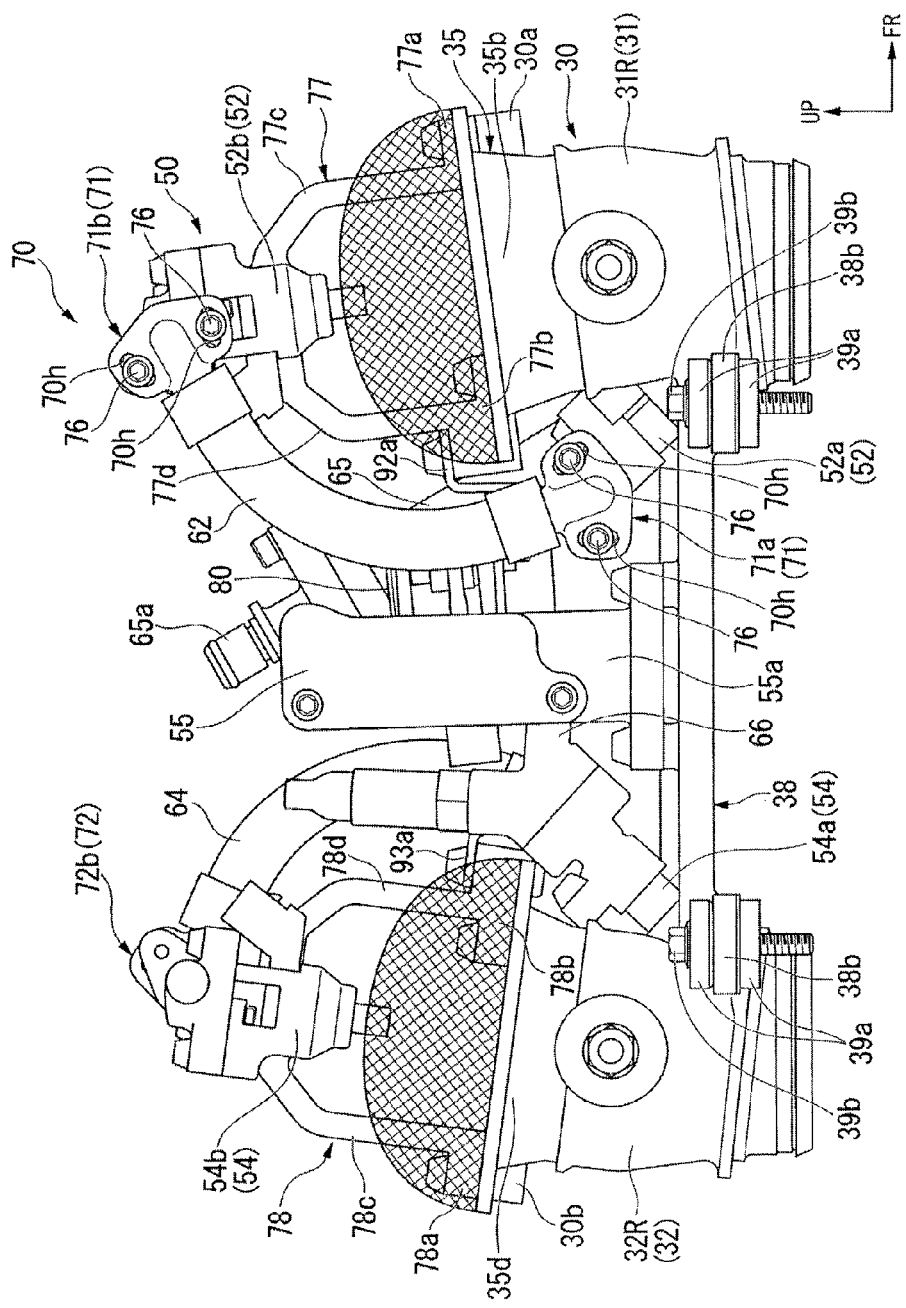
FIG. 8 is a right side view of the aforementioned gyro sensor arrangement structure.

Also referring to FIGS. 7 and 8, the left front injector 51 includes: an upstream left front injector 51a, which is arranged on the lower side of the left front throttle body 31L (specifically, on a lower rear face of the left front throttle body 31L), and positioned on the upstream side of the flow of fuel; and a downstream left front injector 51b, which is arranged on the upper side of the left front throttle body 31L (specifically, a position facing the left front air funnel 35a), and positioned on the downstream side of the flow of fuel.

The right front injector 52 includes: an upstream right front injector 52a, which is arranged on the lower side of the right front throttle body 31R (specifically, on a lower rear face of the right front throttle body 31R), and positioned on the upstream side of the flow of fuel; and a downstream right front injector 52b, which is arranged on the upper side of the right front throttle body 31R (specifically, a position facing the right front air funnel 35b), and positioned on the downstream side of the flow of fuel.

The left rear injector 53 includes: an upstream left rear injector 53a, which is arranged on the lower side of the left rear throttle body 32L (specifically, on a lower front face of the left rear throttle body 32L), and positioned on the upstream side of the flow of fuel; and a downstream left rear injector 53b, which is arranged on the upper side of the left rear throttle body 32L (specifically, a position facing the left rear air funnel 35c), and positioned on the downstream side of the flow of fuel.

The right rear injector 54 includes: an upstream right rear injector 54a, which is arranged on the lower side of the right rear throttle body 32R (specifically, on a lower front face of the right rear throttle body 32R), and positioned on the upstream side of the flow of fuel; and a downstream right rear injector 54b, which is arranged on the upper side of the right rear throttle body 32R (specifically, a position facing the right rear air funnel 35d), and positioned on the downstream side of the flow of fuel.

Also referring to FIG. 6, the upstream left front injector 51a, the upstream right front injector 52a, the upstream left rear injector 53a, and the upstream right rear injector 54a are arranged in a center position in the vehicle width direction of the left front air funnel 35a, the right front air funnel 35b, the left rear air funnel 35c, and the right rear air funnel 35d, respectively.

An upward rising bracket 55a is provided on an upper face in a right side part of the connection plate 38. The auxiliary machinery 55 is attached on a right side part of the bracket 55a.

<Piping>

The piping 60 includes: front first piping 61 attached to the left front injector 51 and the right front injector 52; front second piping 62 provided separately from the front first piping 61, and having an end part connected to the front first piping 61 so as to intersect with the front first piping 61; rear first piping 63 attached to the left rear injector 53 and the right rear injector 54; and rear second piping 64 provided separately from the rear first piping 63, and having an end part connected to the rear first piping 63 so as to intersect with the rear first piping 63.

In the embodiment, the front first piping and the rear first piping are collectively referred to as "first piping," and the front second piping and the rear second piping are collectively referred to as "second piping."

The front first piping 61 includes an upstream front first piping 61a connected to the upstream side of the front second piping 62, and downstream front first piping 61b connected to the downstream side of the front second piping 62.

The rear first piping 63 includes upstream rear first piping 63a connected to the upstream side of the rear second piping 64, and downstream rear first piping 63b connected to the downstream side of the rear second piping 64.

The upstream front first piping 61a is attached to the upstream left front injector 51a and the upstream right front injector 52a. The upstream front first piping 61a extends in the vehicle width direction so as to straddle the upstream left front injector 51a and the upstream right front injector 52a.

The downstream front first piping 61b is attached to the downstream left front injector 51b and the downstream right front injector 52b. The downstream front first piping 61b extends in the vehicle width direction so as to straddle the downstream left front injector 51b and the downstream right front injector 52b. The downstream front first piping 61b has multiple (e.g., a total of four including those at the front and rear in the embodiment) first protrusions 61c, which are spaced apart in the vehicle width direction for the length of a later-mentioned first connection shaft 77e, and protrude frontward and rearward so as to form protrusions.

In the embodiment, the upstream left front injector 51a and the upstream right front injector 52a are provided in the upstream front first piping 61a, while the downstream left front injector 51b and the downstream right front injector 52b are provided in the downstream front first piping 61b.

The upstream rear first piping 63a is attached to the upstream left rear injector 53a and the upstream right rear injector 54a. The upstream rear first piping 63a extends in the vehicle width direction so as to straddle the upstream left rear injector 53a and the upstream right rear injector 54a.

The downstream rear first piping 63b is attached to the downstream left rear injector 53b and the downstream right rear injector 54b. The downstream rear first piping 63b extends in the vehicle width direction so as to straddle the downstream left rear injector 53b and the downstream right rear injector 54b. The downstream rear first piping 63b has multiple (e.g., a total of four including those at the front and rear in the embodiment) second protrusions 63c, which are spaced apart in the vehicle width direction for the length of a later-mentioned second connection shaft 78e, and protrude frontward and rearward so as to form protrusions.

In the embodiment, the upstream left rear injector 53a and the upstream right rear injector 54a are provided in the upstream rear first piping 63a, while the downstream left rear injector 53b and the downstream right rear injector 54b are provided in the downstream rear first piping 63b.

A fuel filter 65 for removing foreign matter and others from fuel pumped from an unillustrated fuel pump is provided, at the upstream end of the upstream front first piping 61a. The fuel pressurized by the fuel pump is supplied from the fuel tank 8. In left side view of FIG. 7, the fuel filter 65 extends obliquely, such that it is positioned closer to the rear toward the upper side. A cylindrical nozzle 65a is provided at the upstream end of the fuel filter 65. Fuel supply piping (none are shown) leading to the fuel pump is connected to the nozzle 65a.

Connection piping 66 for connecting the downstream end of the upstream front first piping 61a and the upstream end of the upstream rear first piping 63a is provided, between the upstream front first piping 61a and the upstream rear first piping 63a. In top view of FIG. 5, the connection piping 66 extends obliquely, such that it is positioned closer to the left toward the rear side from the downstream end of the upstream front first piping 61a, and reaches the upstream end of the upstream rear first piping 63a.

<Fuel Supply Path>

Hereinbelow, a supply path of fuel pumped from the fuel pump will be described. Note that in FIG. 5, arrows F indicate the flow of fuel.

The fuel pumped from the fuel pump is filtered through the fuel filter 65, and then flows into the upstream end of the upstream front first piping 61a. The fuel having flowed into the upstream end of the upstream front first piping 61a flows through the upstream front first piping 61a, and branches into the upstream left front injector 51a and the downstream side of the upstream front first piping 61a.

The fuel having branched to the upstream left front injector 51a is injected to the intake passage 31a, inside the left front throttle body 31L.

The fuel having branched into the downstream side of the upstream front first piping 61a, branches into the upstream right front injector 52a, the upstream end of the front second piping 62, and the upstream end of the connection piping 66.

The fuel having branched to the upstream right front injector 52a is injected to the intake passage 31b, inside the right front throttle body 31R.

The fuel having branched to the upstream end of the front second piping 62 flows through the front second piping 62, and flows into the upstream end of the downstream front first piping 61b. The fuel having flowed into the upstream end of the downstream front first piping 61b flows through the downstream front first piping 61b, and branches into the downstream right front injector 52b and the downstream side of the downstream front first piping 61b.

The fuel having branched to the downstream right front injector 52b is injected to the intake passage 31b, inside the right front throttle body 31R.

The fuel having branched to the downstream side of the downstream front first piping 61b flows through the downstream front first piping 61b, and flows into the downstream left front injector 51b. The fuel having flowed into the downstream left front injector 51b is injected to the intake passage 31a, inside the left front throttle body 31L.

The fuel having branched to the upstream side of the connection piping 66 flows through the connection piping 66, and branches into the upstream right rear injector 54a and the upstream end of the upstream rear first piping 63a.

The fuel having branched to the upstream right rear injector 54a is injected to the intake passage 32b, inside the right rear throttle body 32R.

The fuel having branched to the upstream end of the upstream rear first piping 63a flows through the upstream rear first piping 63a, and branches into the upstream left rear injector 53a and the upstream end of the rear second piping 64.

The fuel having branched to the upstream left rear injector 53a is injected to the intake passage 32a, inside the left rear throttle body 32L.

The fuel having branched to the upstream end of the rear second piping 64 flows through the rear second piping 64, and flows into the upstream end of the downstream rear first piping 63b. The fuel having flowed into the upstream end of the downstream rear first piping 63b flows through the downstream rear first piping 63b, and branches into the downstream left rear injector 53b and the downstream side of the downstream rear first piping 63b.

The fuel having branched to the downstream left rear injector 53b is injected to the intake passage 32a, inside the left rear throttle body 32L.

The fuel having branched to the downstream side of the downstream rear first piping 63b flows through the downstream rear first piping 63b, and flows into the downstream right rear injector 54b. The fuel having flowed into the downstream right rear injector 54b is injected to the intake passage 32b, inside the right rear throttle body 32R.

Thus, the fuel pumped from the fuel pump flows smoothly through the pipings 61 to 66. Then, the upstream and downstream left front injectors 51a, 51b inject fuel to the intake passage 31a inside the left front throttle body 31L, the upstream and downstream right front injectors 52a, 52b inject fuel to the intake passage 31b inside the right front throttle body 31R, the upstream and downstream left rear injectors 53a, 53b inject fuel to the intake passage 32a inside the left rear throttle body 32L, and the upstream and downstream right rear injectors 54a, 54b inject fuel to the intake passage 32b inside the right rear throttle body 32R. The gyro sensor 80 is arranged in a space surrounded by the fuel filter 65, the upstream front first piping 61a, the connection piping 66, and the upstream rear first piping 63a.

<Connection Part>

Also referring to FIGS. 7 and 8, a front connection member 71 includes an upstream front connection member 71a connecting the downstream end of the upstream front first piping 61a and the upstream end of the front second piping 62, and a downstream front connection member 71b connecting the upstream end of the downstream front first piping 61b and the downstream end of the front second piping 62.

A rear connection member 72 includes an upstream rear connection member 72a connecting the downstream end of the upstream rear first piping 63a and the upstream end of the rear second piping 64, and a downstream rear connection member 72b connecting the upstream end of the downstream rear first piping 63b and the downstream end of the rear second piping 64.

In the embodiment, connection parts of the pipings 61 to 64 provided between end parts of the pipings 61 to 64, are collectively referred to as "connection member." A connection member 70 includes the front connection member 71 connecting the front first piping 61 and the front second piping 62, and the rear connection member 72 connecting the rear first piping 63 and the rear second piping 64.

The front connection member 71 and the rear connection member 72 have long adjustment holes 70h, which each extend so as to allow adjustment of the relative angle between the front first piping 61 and the front second piping 62, and the relative angle between the rear first piping 63 and the rear second piping 64. Hereinafter, the adjustment hole 70h in the rear connection member 72 will be described with reference to FIG. 9. Since the adjustment hole 70h in the front connection member 71 is the same as the adjustment hole 70h in the rear connection member 72, detailed description thereof will be omitted. Note that in FIG. 9, reference numeral 76 indicates a bolt (bolt for fixing the connection members 71, 72) inserted into the adjustment hole 70h.

Figure 9:
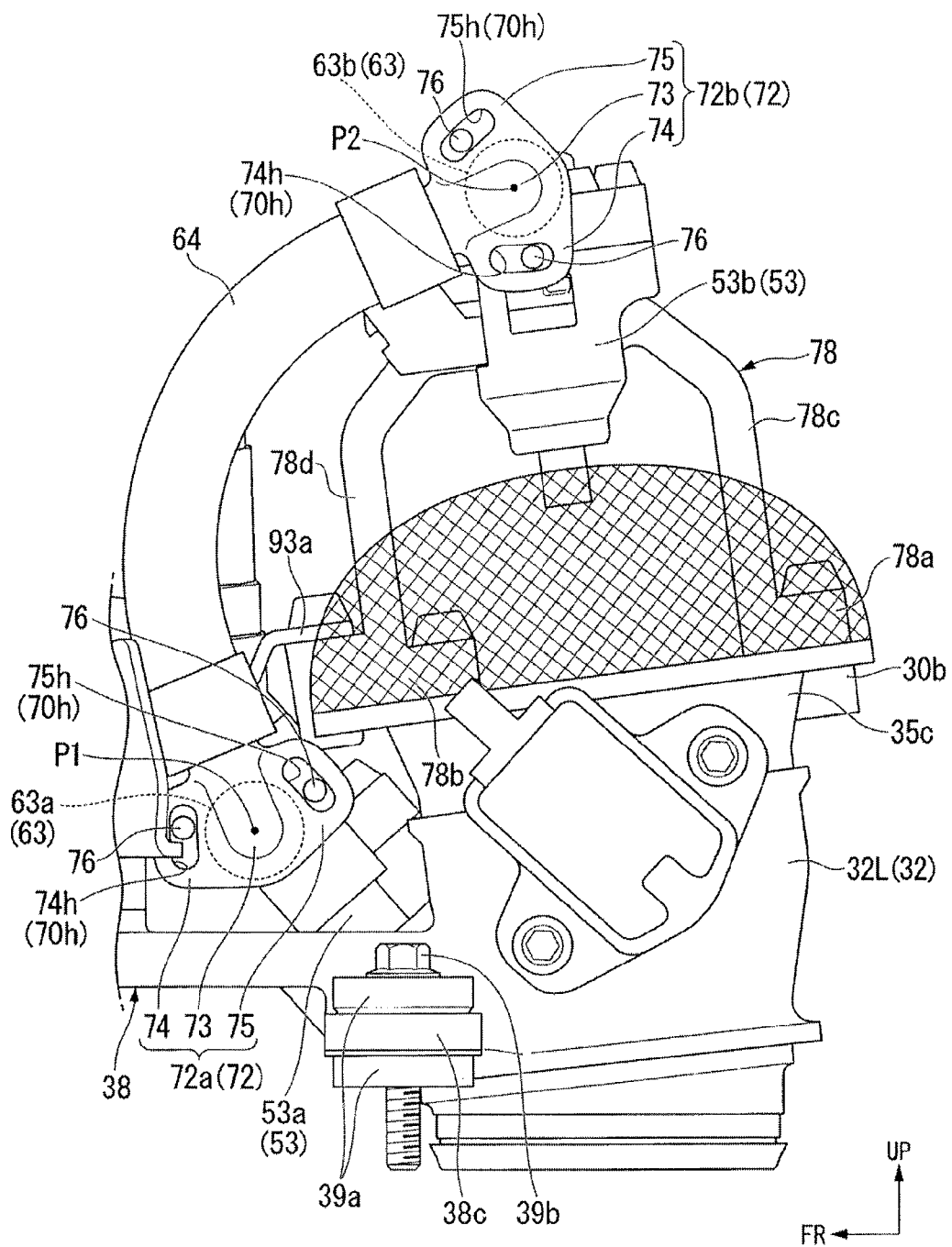
FIG. 9 is a left side view in which a peripheral structure of the aforementioned gyro sensor is enlarged.

Referring to FIG. 9, in left side view, the rear connection member 72 (the upstream rear connection member 72a and the downstream rear connection member 72b) includes a flow path forming portion 73, a first connection portion 74 provided on one side of the flow path forming portion 73, and a second connection portion 75 provided on the other side of the flow path forming portion 73 opposite to the first connection portion 74.

The flow path forming portion 73 of the upstream rear connection member 72a forms a flow path, which guides fuel from the upstream rear first piping 63a to the rear second piping 64.

The flow path forming portion 73 of the downstream rear connection member 72b forms a flow path, which guides fuel from the rear second piping 64 to the downstream rear first piping 63b.

The adjustment hole 70h is formed in both of the upstream rear connection member 72a and the downstream rear connection member 72b.

The adjustment hole 70h of the upstream rear connection member 72a is formed into an arc shape, along the annular outer periphery of the upstream rear first piping 63a in left side view. In FIG. 9, point P1 is the center of the upstream rear first piping 63a. The adjustment hole 70h of the upstream rear connection member 72a, is capable of adjusting the relative angle between the upstream rear first piping 63a and the rear second piping 64 around point P1, when viewed from the vehicle width direction.

The adjustment hole 70h of the downstream rear connection member 72b is formed into an arc shape, along the annular outer periphery of the downstream rear first piping 63b in left side view. In FIG. 9, point P2 is the center of the downstream rear first piping 63b. The adjustment hole 70h of the downstream rear connection member 72b, is capable of adjusting the relative angle between the downstream rear first piping 63b and the rear second piping 64 around point P2, when viewed from the vehicle width direction.

The adjustment hole 70h includes a first adjustment hole 74h formed in the first connection portion 74, and a second adjustment hole 75h formed in the second connection portion 75.

When viewed from the vehicle width direction, the first adjustment hole 74h and the second adjustment hole 75h in the upstream rear connection member 72a, are shifted closer to the upper side (upstream end side of the rear second piping 64) than point P1, and are formed into arc shapes based on point P1.

When viewed from the vehicle width direction, the first adjustment hole 74h and the second adjustment hole 75h in the downstream rear connection member 72b are shifted closer to the front side (downstream end side of the rear second piping 64) than point P2, and are formed into arc shapes based on point P2.

<Supporting Member>

Referring to FIGS. 4 to 6, supporting members 77, 78 for supporting the piping 60 are provided in the throttle body 30. The supporting members 77, 78 include the first supporting member 77 for supporting the downstream front first piping 61b, and the second supporting member 78 for supporting the downstream rear first piping 63b.

The first supporting member 77 includes: a front first base portion 77a fixed to the front connection portion 30a; a rear first base portion 77b fixed to the connection plate 38 behind the front first base portion 77a; a front first standing portion 77c standing up from the front first base portion 77a, and formed into a Y shape in front view of FIG. 6; a rear first standing portion 77d standing up from the rear first base portion 77b, and formed into a Y shape that overlaps with the front first standing portion 77c in front view of FIG. 6; and the first connection shaft 77e connecting left and right connection portions of the upper branch ends of the front first standing portion 77c and the upper branch ends of the rear first standing portion 77d, and formed into a bar extending in the vehicle width direction.

The second supporting member 78 includes: a rear second base portion 78a fixed to the rear connection portion 30b; a front second base portion 78b fixed to the connection plate 38 in front of the rear second base portion 78a; a rear second standing portion 78c standing up from the rear second base portion 78a, and formed into a Y shape in rear view; a front second standing portion 78d standing up from the front second base portion 78b, and formed into a Y shape that overlaps with the rear second standing portion 78c in rear view; and the second connection shaft 78e connecting left and right connection portions of the upper branch ends of the rear second standing portion 78c and the upper branch ends of the front second standing portion 78d, and formed into a bar extending in the vehicle width direction.

<Spacer>

Referring to FIGS. 4 and 6, a spacer 79 is provided between the piping 60 and the supporting members 77, 78 (first supporting member 77, second supporting member 78). The spacer 79 includes a first spacer 79a arranged between the downstream front first piping 61b and the first supporting member 77, and a second spacer 79b arranged between the downstream rear first piping 63b and the second supporting member 78.

The first spacer 79a is formed such that collars, which are sandwiched between the front and rear first protrusions 61c of the downstream front first piping 61b, and upper end parts of the front and rear first standing portions 77c, 77d of the first supporting member 77, are combined as one body. The first spacer 79a is thick in the vertical direction, and has substantially the same length as the longitudinal length of the front and rear first protrusions 61c, in top view of FIG. 5. Note that the first spacer 79a may be a separate collar.

The second spacer 79b is formed such that collars, which are sandwiched between the front and rear second protrusions 63c of the downstream rear first piping 63b, and upper end parts of the front and rear second standing portions 78c, 78d of the second supporting member 78, are combined as one body. The second spacer 79b has a smaller thickness in the vertical direction than the first spacer 79a, and has substantially the same length as the longitudinal length of the front and rear second protrusions 63c, in top view of FIG. 5. Note that the second spacer 79b may be a separate collar.

\<Gyro Sensor\>

Referring to FIG. 5, the gyro sensor 80 is positioned on the vehicle left-right centerline CL. To be specific, the gyro sensor 80 has a rectangular parallelepiped main body part, and is arranged such that the center of the main body part in the vehicle width direction overlaps with the vehicle left-right centerline CL in top view. This can reduce the influence of left and right tilting of the vehicle.

Figure 10:
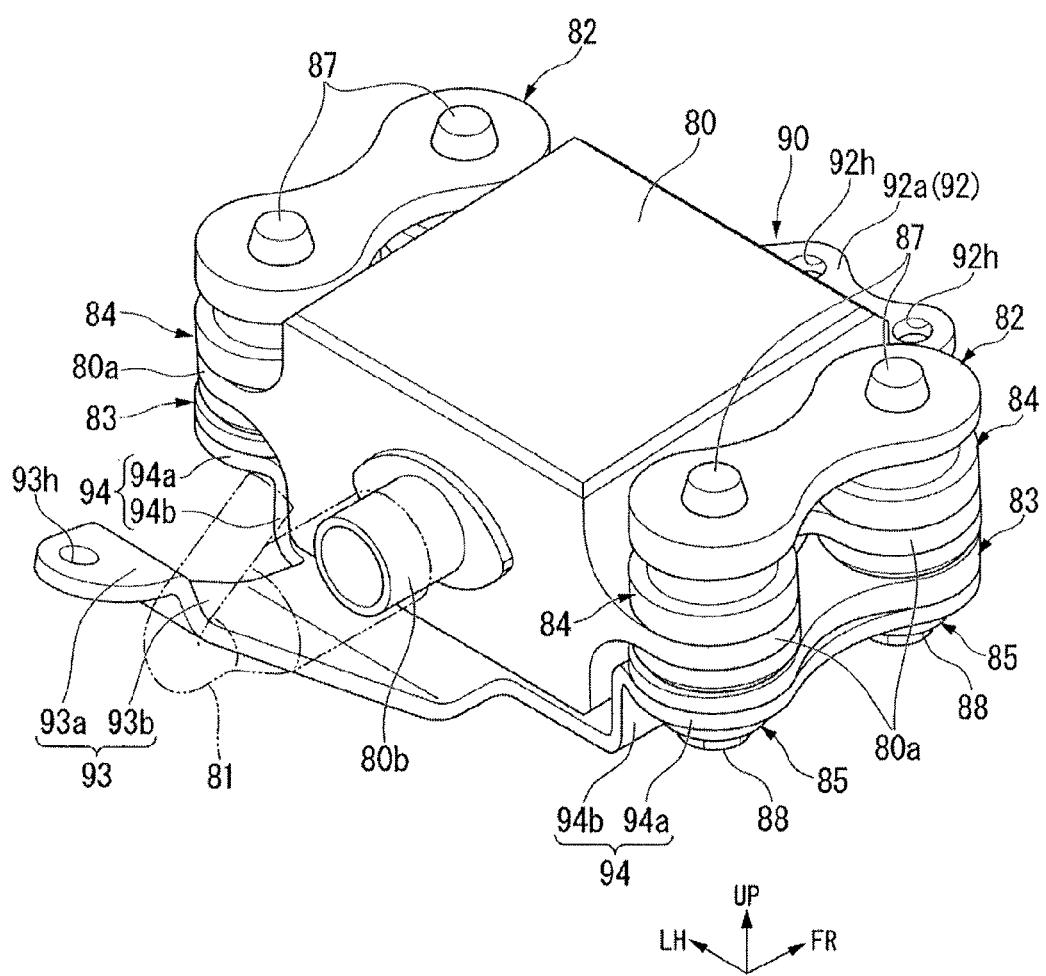
FIG. 10 is a perspective view of a supporting structure of the aforementioned gyro sensor, as seen from the rear upper right direction.

Also referring to FIG. 10, an attachment flange 80a for attaching the gyro sensor 80 is formed in both left and right end parts of the gyro sensor 80. The attachment flanges 80a protrude to the left and right sides from both left and right side faces of the gyro sensor 80. Two each of the attachment flanges 80a are arranged on the left and right, so as to correspond to attachment parts (a front and rear pair on both left and right side faces of the gyro sensor 80) of the gyro sensor 80.

A wiring connection portion 80b for connecting wiring 81 that leads to an unillustrated control unit is formed, in a rear end part of the gyro sensor 80.

The gyro sensor 80 is fastened and fixed to a bracket 90 with bolts 87 and nuts 88 through grommets 84 (elastic members), with the grommets 84 attached to the left and right attachment flanges 80a, an upper correction plate 82 arranged above the attachment flanges, and a lower correction plate 83 arranged below the attachment flanges.

Figure 11:
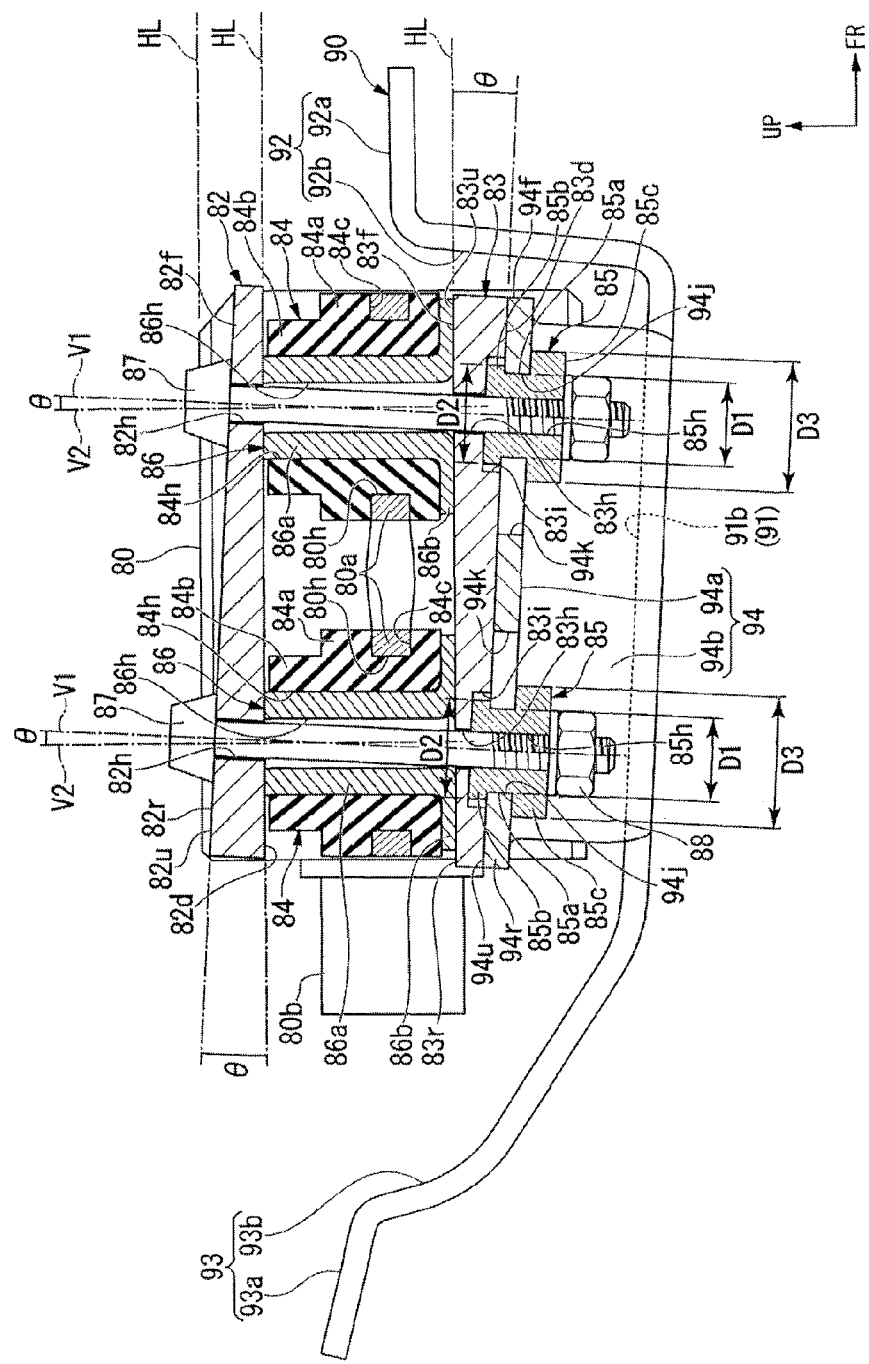
FIG. 11 is a right side view of the aforementioned supporting structure of the gyro sensor, including an XI-XI section of FIG. 5.

Also referring to FIG. 11, attachment holes 80h, which are opened in the vertical direction at positions corresponding to the attachment parts of the gyro sensor 80, are formed in the attachment flange 80a. The attachment hole 80h has a larger pore size than the outer diameter of a shaft part of the bolt 87.

\<Bracket\>

Referring to FIGS. 4 and 5, the bracket 90 supported to the throttle body 30 is provided, between the first supporting member 77 and the second supporting member 78. The bracket 90 is arranged so as to bridge the front throttle body 31 and the rear throttle body 32. The bracket 90 is formed into a longitudinally-extending shape connecting the rear first base portion 77b of the first supporting member 77, and the front second base portion 78b of the second supporting member 78. The gyro sensor 80 is arranged in a longitudinal center part of the bracket 90.

Figure 12:
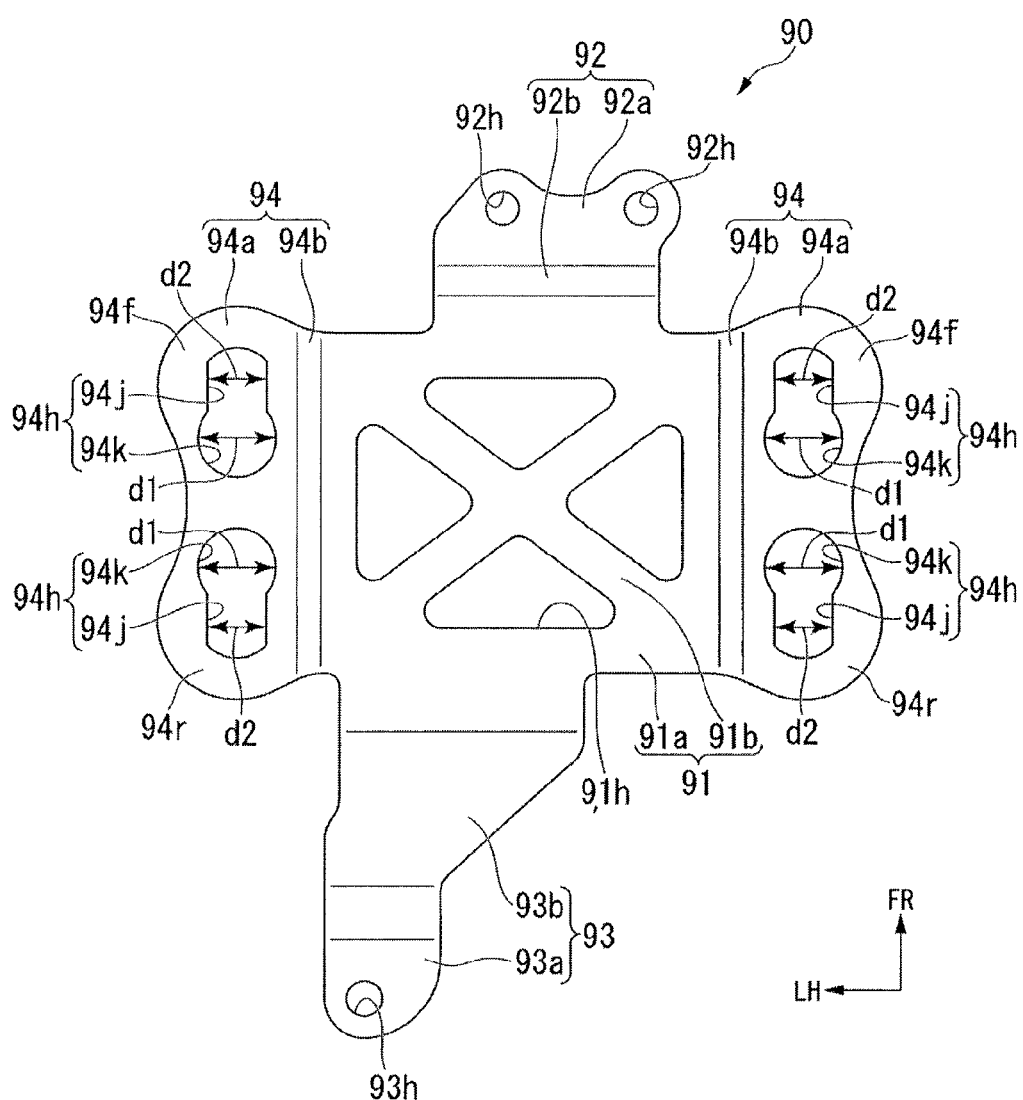
FIG. 12 is a top view of a bracket in which the aforementioned gyro sensor is arranged.

Also referring to FIGS. 11 and 12, the bracket 90 has a main body portion 91 facing a lower face of the gyro sensor 80, a front extension portion 92 provided on a front end part of the main body portion 91, a rear extension portion 93 provided on a rear end part of the main body portion 91, and left and right supporting portions 94 provided on left and right end parts of the main body portion 91.

The main body portion 91 has a rectangular frame-shaped frame portion 91a, and an X-shaped connection portion 91b in top view of FIG. 12. The main body portion 91 has an opening portion 91h, which is opened in the vertical direction and formed into a triangular shape having rounded corners, in top view of FIG. 12.

The front extension portion 92 includes a front connection portion 92a connected to the rear first base portion 77b of the first supporting member 77, and a front wall portion 92b bridging the rear end of the front connection portion 92a and the front end of the main body portion 91. In right side view of FIG. 11, the front wall portion 92b extends frontward from the front end of the main body portion 91, and then rises steeply toward the front upper direction to reach the rear end of the front connection portion 92a. The front connection portion 92a has paired left and right through holes 92h, which are opened in the thickness direction of the front connection portion 92a.

For example, the front connection portion 92a is fastened and fixed by inserting bolts into the through holes 92h, and screwing the bolts into nuts (not shown) provided in the rear first base portion 77b. Note that the front connection portion 92a may be fixed by welding, for example.

The rear extension portion 93 includes a rear connection portion 93a connected to the front second base portion 78b of the second supporting member 78, and a rear wall portion 93b bridging the front end of the rear connection portion 93a and the rear end of the main body portion 91. In right side view, the rear wall portion 93b extends rearward from the rear end of the main body portion 91, extends gradually toward the rear upper direction, and then rises steeply toward the rear upper direction to reach the front end of the rear connection portion 93a. The rear connection portion 93a has a through hole 93h, which is opened in the thickness direction of the rear connection portion 93a.

For example, the rear connection portion 93a is fastened and fixed by inserting a bolt into the through hole 93h, and screwing the bolt into a nut (not shown) provided in the front second base portion 78b. Note that the rear connection portion 93a may be fixed by welding, for example.

The left and right supporting portions 94 include: left and right collar supporting portions 94a formed into a plate that can support collars 85; and left and right wall portions 94b bridging inner ends in the vehicle width direction of the left and right collar supporting portions 94a, and outer ends in the vehicle width direction of the main body portion 91. The left and right wall portions 94b extend upward from left and right ends of the main body portion 91, and reach the inner ends in the vehicle width direction of the left and right collar supporting portions 94a.

The left and right collar supporting portions 94a have long holes 94h, which each includes: a large-diameter portion 94k opened in the thickness direction of the left and right collar supporting portions 94a, and having an inner diameter d1 larger than an outer diameter D2 of a later-mentioned upper flange portion 85b (flange portion); and a small-diameter portion 94j continuous with the large-diameter portion 94k, and having an inner diameter d2 larger than an outer diameter D1 of a later-mentioned tube portion 85a and smaller than the outer diameter D2. For example, the long hole 94h is a hook slot. This can prevent the collar 85 from falling off when the bolt 87 is detached.

Note that the inner diameter d1 of the large-diameter portion 94k may be the same as the outer diameter D2 of the upper flange portion 85b, and the inner diameter d2 of the small-diameter portion 94j may be the same as the outer diameter D1 of the tube portion 85a.

The long holes 94h are opened in positions where the small-diameter portions 94j are respectively aligned with the attachment holes 80h. The long holes 94h are arranged at the front and rear, such that the large-diameter portions 94k are positioned closer to the longitudinal center part of the left and right collar supporting portions 94a. This can make the left and right collar supporting portions 94a smaller than a case where the large-diameter portions 94k are positioned closer to front and rear end parts of the left and right collar supporting portions 94a. Hence, the left and right collar supporting portions 94a can be arranged favorably, in the space between the front throttle body 31 and the rear throttle body 32.

The left and right collar supporting portions 94a have a front supporting portion 94f in a position surrounding the small-diameter portion 94*j*, and a rear supporting portion 94*r* in a position behind the front supporting portion 94*r*. The front and rear supporting portions 94*f*, 94*r* have wide seating faces, on the outer side in the radial direction of the small-diameter portion 94*j* and on the outer side in the vehicle width direction, of longitudinal center parts of the left and right collar supporting portions 94*a*.

<Grommet>

The grommet 84 is formed into a cylindrical shape having a through hole 84*h*, which is opened in the vertical direction. The grommet 84 has a first tube portion 84*a*, and a second tube portion 84*b* having a smaller outer diameter than the outer diameter of the first tube portion 84*a*. An annular groove 84*c*, which is recessed radially inward from the outer peripheral surface of the first tube portion 84*a*, is formed on an outer peripheral part of the first tube portion 84*a*. An edge part surrounding the attachment hole 80*h* of the attachment flange 80*a* fits into the groove 84*c*. The grommet 84 protrudes to upper and lower sides from the attachment flange 80*a*, with the groove 84*c* fitted into the edge part.

A flanged collar 86 is inserted into the through hole 84*h* of the grommet 84. The flanged collar 86 includes: a shaft portion 86*a*, which is formed into a cylindrical shape having a through hole 86*h* opened in the vertical direction; and a flange portion 86*b*, which is formed into an annular shape protruding radially outward from a lower end part of the shaft portion 86*a*. The vertical length of the shaft portion 86*a* is slightly larger than the vertical length of the grommet 84. The flange portion 86*b* abuts on a lower end face of the first tube portion 84*a*, with the flanged collar 86 inserted into the through hole 84*h* of the grommet 84.

<Correction Plate>

The upper correction plate 82 is formed into a plate, which extends in the longitudinal direction and is tapered in cross-sectional view of FIG. 11. The upper correction plate 82 is a rigid member such as metal, and has a horizontal seating face 82*d* (lower face), and an inclined face 82*u* (upper face), which is inclined at an angle θ with respect to the seating face 82*d*. The upper correction plate 82 has through holes 82*h* opened in the vertical direction, in positions corresponding to the attachment holes 80*h*. The through hole 82*h* is formed perpendicular to the inclined face 82*u*, and has a pore size slightly larger than the outer diameter of the shaft part of the bolt 87. The upper correction plate 82 has a front seat portion 82*f* and a rear seat portion 82*r* thicker than the front seat portion 82*f*, in positions surrounding the through holes 82*h*. The front and rear seat portions 82*f*, 82*r* have wide seating faces, on the outer side in the vehicle width direction of a longitudinal center part of the upper correction plate 82.

The lower correction plate 83 is formed into a plate, which extends in the longitudinal direction, and is tapered in such a manner that the upper correction plate 82 is inverted in the longitudinal direction and the inclination direction is reversed in cross-sectional view of FIG. 11. The lower correction plate 83 is a rigid member such as metal, and has a horizontal seating face 83*u* (upper face), and an inclined face 83*d* (upper face), which is inclined at the angle θ with respect to the seating face 83*u*. The lower correction plate 83 has through holes 83*h* opened in the vertical direction, in positions corresponding to the attachment holes 80*h*. The through hole 83*h* is formed perpendicular to the inclined face 83*d*, and has a pore size slightly larger than the outer diameter of the shaft part of the bolt 87. The lower correction plate 83 has a front seat portion 83*f* and a rear seat portion 83*r* thinner than the front seat portion 83*f*, in positions surrounding the through holes 83*h*. The front and rear seat portions 83*f*, 83*r* have wide seating faces, on the outer side in the vehicle width direction of a longitudinal center part of the lower correction plate 83. Concave portions 83*i* depressed upward are formed in the inclined face 83*d* of the lower correction plate 83, in positions surrounding the through holes 83*h*.

Since the gyro sensor 80 is attached to a supporting face 94*u* through the upper and lower correction plates 82, 83, it is possible to correct the attachment angle of the gyro sensor 80 with respect to the supporting face 94*u* and maintain the horizontal state, even when the supporting face 94*u* is inclined for the angle θ with respect to a horizontal line HL.

Note that the inclination angle θ of the supporting face 94*u* is equivalent to an angle of change in longitudinal inclination of the vehicle body, which has changed due to adjustment in a front-wheel suspension device and a rear-wheel suspension device (none are shown), i.e., the difference between the inclination angle after adjustment, and the inclination angle in the normal state. In the embodiment, the vehicle body is inclined frontward for the angle θ.

<Collar>

The collar 85 includes: a cylindrical tube portion 85*a* having a through hole 85*h* opened in the vertical direction; the annular upper flange portion 85*b* protruding radially outward from an upper end part of the tube portion 85*a*, and having the outer diameter D2 larger than the outer diameter D1 of the tube portion 85*a*; and a lower flange portion 85*c* protruding radially outward from a lower end part of the tube portion 85*a*, and having an outer diameter D3 larger than the outer diameter D2 of the upper flange portion 85*b*.

Of the collars 85, the upper flange portions 85*b* and the tube portions 85*a* are inserted into the large-diameter portions 94*k* of the left and right collar supporting portions 94*a*, and are slid toward the small-diameter portions 94*j*. Thus, the collars 85 are supported to the front and rear supporting portions 94*f*, 94*r* of the left and right collar supporting portions 94*a*, with the tube portions 85*a* inserted into the small-diameter portions 94*j* of the left and right collar supporting portions 94*a*, and the upper and lower flange portions 85*b*, 85*c* arranged such that they sandwich the small-diameter portions 94*j* from upper and lower sides. Note that the vertical gap between the upper flange portion 85*b* and the lower flange portion 85*c* is substantially the same size as the thickness of the left and right collar supporting portions 94*a*.

<Attachment of Gyro Sensor>

Hereinafter, a description will be given of an example of how to attach the gyro sensor 80.

First, the inclined face 83*d* of the lower correction plate 83 is placed on the supporting faces 94*u* (upper face) of the left and right collar supporting portions 94*a*, such that the upper flange portions 85*b* are accommodated inside the concave portions 83*i*, with the collars 85 supported to the front and rear supporting portions 94*f*, 94*r* of the left and right collar supporting portions 94*a*, and the through holes 83*h* in the lower correction plate 83 are aligned with the through holes 85*h* in the collars 85. Note that the depth of the concave portion 83*i* is substantially the same as the thickness of the upper flange portion 85*b*.

Of the lower correction plate 83, the inclined face 83*d* is inclined upward toward the rear for the angle θ, with respect to the seating face 83*u*, and therefore the seating face 83*u* is parallel to the horizontal line HL. At this time, since the through holes 83*h* in the lower correction plate 83 are formed perpendicular to the inclined face 83*d*, the axes of the through holes 83*h* overlap with axes V1 of the through holes 85*h* in the collars 85, and the through holes 83*h* become continuous with the through holes 85h on the same axis. Note that the axis V1 is perpendicular to the supporting face 94u, and therefore is inclined for the angle θ with respect to a vertical line V2.

Next, the lower ends of the flange portions 86b of the flanged collars 86 are placed on the seating face 83u of the lower correction plate 83, with the grommets 84 and the flanged collars 86 attached to the attachment flanges 80a of the gyro sensor 80, and the through holes 86h in the flanged collars 86 are aligned with the through holes 83h in the lower correction plate 83. At this time, since the seating face 83u of the lower correction plate 83 is parallel to the horizontal line HL, the flange portions 86b and the attachment flanges 80a are also parallel to the horizontal line HL. Note that the axes of the grommets 84 and flanged collars 86 coincide with the vertical line V2.

Next, the seating face 82d of the upper correction plate 82 is placed on the upper end of the shaft portions 86a of the flanged collars 86, and the through holes 82h in the upper correction plate 82 are aligned with the through holes 86h in the flanged collars 86. At this time, since the through holes 82h in the upper correction plate 82 are formed perpendicular to the inclined face 82u, the axes of the through holes 82h overlap with the axes V1.

In this state, the shaft parts of the bolts 87 are inserted into the through holes 82h in the upper correction plate 82, the through holes 86h in the flanged collars 86, the through holes 83h in the lower correction plates 83, and the through holes 85h in the collars 85, and then screw parts protruding downward from the lower flange portions 85c of the collars 85 are fastened and fixed to the nuts 88. Thus, the gyro sensor 80 is supported to the bracket 90. Note that the screw part of the bolt 87 may be fastened and fixed to the collar 85, by providing an internal thread in the collar 85.

As has been described, the above embodiment is the motorcycle 1 including: the body frame 20, the power unit 10 supported to the body frame 20, and the throttle body 30 connected to the power unit 10 and adjusting an intake air amount, in which the gyro sensor 80 for detecting behavior of the vehicle 1 is arranged in the throttle body 30.

According to this configuration, the gyro sensor 80 is arranged in the throttle body 30. Hence, the gyro sensor 80 is arranged closer to the power unit 10 than a case where the gyro sensor 80 is arranged in front of the head pipe 21, so that vibration detected by the gyro sensor 80 as noise can be reduced. Additionally, since the gyro sensor 80 is arranged close to a center of gravity G1 of the vehicle 1, it is less likely to be affected by parallelism inhibition factors. Accordingly, behavior of the vehicle 1 can be detected accurately.

Also, in the above embodiment, the gyro sensor 80 is arranged in the bracket 90 supported to the throttle body 30. Hence, support stiffness of the gyro sensor 80 can be improved.

Also, in the above embodiment, the bracket 90 is arranged so as to bridge the front throttle body 31 and the rear throttle body 32. Hence, rigidity of the bracket 90 can be improved, so that vibration detected by the gyro sensor 80 as noise can be reduced effectively. Accordingly, behavior of the vehicle 1 can be detected even more accurately.

Also, in the above embodiment, the gyro sensor 80 is supported to the bracket 90 through the grommets 84. This can suppress vibration transmitted to the gyro sensor 80, so that behavior of the vehicle 1 can be detected even more accurately.

Also, in the above embodiment, the collar 85 is supported to the supporting portion 94, such that the tube portion 85a is inserted into the small-diameter portion 94j, and the upper and lower flange portions 85b, 85c are arranged so as to sandwich the small-diameter portion 94j from upper and lower sides. Hence, the collar 85 can be kept from falling off when attaching the gyro sensor 80, and workability can be improved.

Also, in the above embodiment, the gyro sensor 80 is arranged inside the air cleaner box 40. Hence, in this configuration, the gyro sensor 80 is not exposed to the outside, and therefore can avoid the influence of rain, for example (external factor), and its protective property can be improved.

Also, in the above embodiment, the gyro sensor 80 is arranged on the clean side 40s, which is positioned on the downstream side of the air cleaner element 41. Hence, the gyro sensor 80 can avoid the influence of dirt and dust, for example (external factor), and its protective property can be improved.

Also, in the above embodiment, the gyro sensor 80 is arranged near the intake part 35, which is provided in the upper part of the throttle body 30. Hence, the gyro sensor 80 can be cooled by use of air taken into the power unit 10. Accordingly, even when the gyro sensor 80 is arranged near the power unit 10, it can avoid the influence of heat of the power unit 10, for example (external factor), and its protective property can be improved.

Note that the present invention is not limited to the above embodiment, and, for example, the straddle type vehicle includes general vehicles that a rider rides by straddling the vehicle body, and includes not only a motorcycle (including a motorized bicycle and a scooter type vehicle), but also three-wheeled vehicles (including vehicles two-wheeled at the front and one-wheeled at the rear, in addition to those one-wheeled at the front and two-wheeled at the rear).

The configuration of the above embodiment is one example of the present invention, and various changes, such as replacing a component of the embodiment with a known component, can be made without departing from the gist of the invention.

What is claimed is:

1. A straddle type vehicle comprising:
a body frame;
a power unit supported to said body frame; and
a throttle body connected to said power unit and adjusting an intake air amount, wherein a gyro sensor for detecting behavior of the vehicle is arranged in said throttle body, wherein
said gyro sensor is arranged in a bracket supported to said throttle body,
said gyro sensor is supported to said bracket through a collar;
said collar includes a cylindrical tube portion, and an annular flange portion having an outer diameter larger than an outer diameter of said tube portion;
said bracket includes a supporting portion, which is formed into a plate capable of supporting said collar;
said supporting portion has a long hole including
a large-diameter portion opened in the thickness direction of said supporting portion, and having an inner diameter which is the same or larger than the outer diameter of said flange portion, and
a small-diameter portion continuous with said large-diameter portion, and having an inner diameter which is the same as the outer diameter of said tube portion, or larger than the outer diameter of said tube portion and smaller than the outer diameter of said flange portion; and said collar is supported to said supporting portion, such that said tube portion is inserted into said small-diameter portion, and said flange portion is arranged so as to sandwich said small-diameter portion at least from the upper side.

2. The straddle type vehicle according to claim 1, wherein:
said power unit includes a front cylinder and a rear cylinder, which are arranged at the front and rear with a gap in between;
said throttle body includes a front throttle body connected to said front cylinder, and a rear throttle body connected to said rear cylinder; and
said bracket is arranged so as to bridge said front throttle body and said rear throttle body.

3. The straddle type vehicle according to claim 1, wherein
said gyro sensor is supported to said bracket through an elastic member.

4. The straddle type vehicle according to claim 1, wherein:
said body frame includes paired left and right main frames;
an air cleaner box for cleaning intake air of said throttle body is provided, between said paired left and right main frames in the vehicle width direction; and
said gyro sensor is arranged inside said air cleaner box.

5. The straddle type vehicle according to claim 4, wherein:
an air cleaner element is provided inside said air cleaner box; and
said gyro sensor is arranged on a clean side positioned on the downstream side of said air cleaner element.

6. The straddle type vehicle according to claim 1, wherein said gyro sensor is arranged near an intake part, which is provided in an upper part of said throttle body.

* * * * *